(12) United States Patent
Chen et al.

(10) Patent No.: US 12,549,978 B2
(45) Date of Patent: Feb. 10, 2026

(54) THROTTLE CONTROL METHOD AND SYSTEM FOR MOBILE DEVICE

(71) Applicant: MediaTek Singapore Pte. Ltd., Singapore (SG)

(72) Inventors: Hung-Yueh Chen, SeongNam-si (KR);
Byeng Hyun Kim, Seongnam-si (KR);
Jung Shup Shin, Seongnam-si (KR);
Shih-Hsin Chen, Hsinchu (TW);
Chih-Chieh Lai, Hsinchu (TW);
Chung-Pi Lee, Hsinchu (TW);
Jungwoo Lee, Seongnam-si (KR);
Yu-Lun Chang, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 428 days.

(21) Appl. No.: 18/132,449

(22) Filed: Apr. 10, 2023

(65) Prior Publication Data

US 2024/0129766 A1    Apr. 18, 2024

Related U.S. Application Data

(60) Provisional application No. 63/379,151, filed on Oct. 12, 2022.

(51) Int. Cl.
*H04W 24/08*    (2009.01)
*H04B 1/3827*   (2015.01)
*H04L 41/5067*  (2022.01)

(52) U.S. Cl.
CPC .......... *H04W 24/08* (2013.01); *H04B 1/3827* (2013.01); *H04L 41/5067* (2013.01)

(58) Field of Classification Search
CPC .. H04W 24/08; H04B 1/3827; H04L 41/5067; H04L 43/16
See application file for complete search history.

(56) References Cited

U.S. PATENT DOCUMENTS

| | | | |
|---|---|---|---|
| 2015/0031326 A1 | 1/2015 | Begin | |
| 2019/0028916 A1* | 1/2019 | Kashyap | H04W 28/0221 |
| 2020/0336396 A1* | 10/2020 | Su | H04L 41/5009 |

FOREIGN PATENT DOCUMENTS

CN    113347111 A    9/2021

* cited by examiner

*Primary Examiner* — Ayodeji O Ayotunde
(74) *Attorney, Agent, or Firm* — Winston Hsu

(57) ABSTRACT

A throttle control method for a mobile device include collecting input data, generating a first set of user experience indices according to the input data, and checking whether a user experience index of the first set of user experience indices satisfies a UEI threshold. The input data includes common information data, current configuration data and a plurality of throttle control parameters. Each user experience index of the first set of user experience indices is corresponding to at least one of throttle control parameter of the plurality of throttle control parameters.

19 Claims, 8 Drawing Sheets

THROTTLE CONTROL METHOD AND SYSTEM FOR MOBILE DEVICE

CROSS REFERENCE TO RELATED APPLICATIONS

This application claims the benefit of U.S. Provisional Application No. 63/379,151, filed on Oct. 12, 2022. The content of the application is incorporated herein by reference.

BACKGROUND

Mobile devices are becoming necessities for people on personal and professional levels. These mobile devices include cellular phones, tablet computers, game consoles, and other portable electronic devices.

One unique aspect of mobile devices is that they typically do not have active coolers which are often found in larger computing devices like laptop and desktop computers. Instead of using fans, mobile devices may rely on the spatial arrangement of electronic packaging so that heat producing components are not positioned in proximity to one another. Many mobile devices may also rely on passive cooling devices, such as heat sinks, to manage thermal energy among the electronic components in a mobile device. In fact, mobile devices are typically limited in size and, thus, space for components within a mobile device is often very limited. As such, there rarely is enough space for using clever spatial arrangements within a mobile device to manage heat dissipation thus preserving battery life.

Current systems and methods rely on various temperature sensors embedded on the chip and elsewhere to monitor the dissipation of thermal energy and then use the measurements to trigger application of thermal management techniques that adjust workload allocations, processing speeds, etc. to reduce thermal generation and perverse battery life.

For example, in an effort to manage temperature of mobile devices, prior art thermal management techniques aggressively reduce processor performance until the internal temperature drops below a target thermal threshold. Given that a slow reacting thermistor is a common choice for a temperature sensor in a mobile device, such an approach to temperature management can be problematic. The effects of processor performance adjustments can be slow to reflect in the readings of a thermistor.

In response to the temperature management, prior art thermal management techniques reactively engage in performance throttling and/or execute thermal resets of processors in order to avoid violations of thermal specifications. The reactive measures taken by prior art throttle control techniques can cause drastic performance downgrade which greatly impacts user experience. Hence, there is the need for an improved throttle control mechanism.

SUMMARY

An embodiment provides a throttle control method for a mobile device including collecting input data, generating a first set of user experience indices according to the input data, and checking whether a user experience index of the first set of user experience indices satisfies a UEI threshold. The input data includes common information data, current configuration data and a plurality of throttle control parameters. Each user experience index of the first set of user experience indices is corresponding to at least one of throttle control parameter of the plurality of throttle control parameters.

An embodiment provides a mobile device including an antenna, a memory and a processor coupled to the memory and the antenna. The processor is used to collect input data, generate a first set of user experience indices according to the input data, check whether a user experience index of the first set of user experience satisfies a UEI threshold, assign user experience indices of the first set of user experience indices satisfying the UEI threshold to a second set of user experience indices, select at least one throttle control parameter of the plurality of throttle control parameters corresponding to a user experience index of the second set of user experience indices, and apply the selected throttle control parameter to configure the mobile device. The input data includes common information data, current configuration data and a plurality of throttle control parameters. Each user experience index of the first set of user experience indices is corresponding to at least one of throttle control parameter of the plurality of throttle control parameters.

These and other objectives of the present invention will no doubt become obvious to those of ordinary skill in the art after reading the following detailed description of the preferred embodiment that is illustrated in the various figures and drawings.

DETAILED DESCRIPTION

The present disclosure may be understood by reference to the following detailed description, taken in conjunction with the drawings as described below, and for purposes of illustrative clarity and being easily understood by the readers, various drawings of this disclosure may be simplified, and the elements in various drawings may not be drawn to scale. In addition, the number and dimension of each element shown in drawings are just illustrative and are not intended to limit the scope of the present disclosure.

The ordinal numbers such as "first", "second", etc. are used in the specification and claims to modify the elements in the claims. It does not mean that the required element has any previous ordinal number, and it does not represent the order of a required element and another required element or the order in the manufacturing method. The ordinal number is just used to distinguish the required element with a certain name and another required element with the same certain name.

It should be noted that the technical features in different embodiments described in the following may be replaced, recombined, or mixed with one another to constitute another embodiment without departing from the essence of the disclosure.

Figure 1:
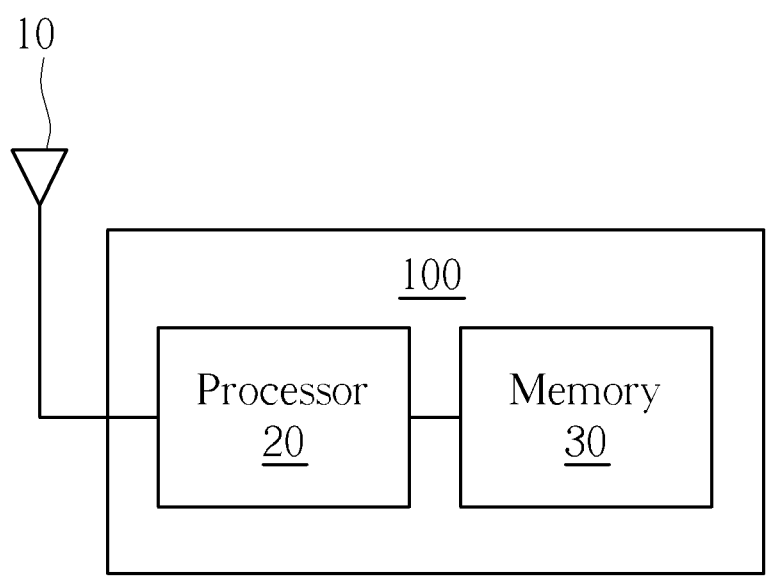
FIG. 1 is a diagram illustrating a mobile device of an embodiment.

FIG. 1 is a diagram illustrating a mobile device 100 of an embodiment. The mobile device 100 includes an antenna 10, a processor 20 and a memory 30. The processor 20 is coupled to the memory 30 and the antenna 10. The antenna 10 may be any type of antenna (e.g., LDS, ceramic or chip antenna) embedded in the mobile device 100. The processor 20 may be any combination of general purpose or special purpose processors such as central processing unit (CPU), graphic processing unit (GPU), application specific integrated circuit (ASIC), field programmable gate array (FPGA), application processor and modem. Also, the processor 20 and the memory 30 can be integrated in a system on chip (SoC). The mobile device 100 with the antenna 10 can be designed to transmit and receive radio 4G LTE and/or 5G NR frequency band signals (i.e., FR1: sub-6 GHz band, and FR2: millimeter wave band).

During the operation, the mobile device 100 typically would have throttle control built-in to manage device temperature. The throttle control method usually includes transmit (TX) power control, uplink throttle, antenna in module head switch, MIMO (multi-input multi-output) reduction, receives (RX) numbers reduction, bandwidth reduction and/or component carrier (CC) reduction . . . etc. With conventional throttle control parameters, the trigger timing for throttling is a predefined temperature threshold. In an example, when the device temperature exceeds 59° C., throttling level 1 can be enabled. In this scenario, the uplink function of the mobile device is active for 100 ms and suspended for 600 ms. In another example, when the device temperature exceeds 64° C., in addition to throttling level 1, throttling level 2 can be enabled. In this scenario, the maximum TX power for the LTE band and/or the FR1 band is reduced by 3 dB.

However, the predefined thresholds do not take in the consideration of operating environment and user scenarios (e.g., heavy downlink and uplink, FTP transfer and gaming). As such, simply implementing the predefined thresholds may lead to poor trigger timing and poor throttling control selection. For example, even when the device temperature does not exceed the threshold, the throttle control parameter can be applied to manage power consumption of the mobile device 100. For example, when the mobile device 100 is positioned at a cell edge of the cell network, limiting the maximum TX power can possibly cause radio link failure. In addition, in an area with good signal strength, reducing MIMO number may be more beneficial than reducing component carriers. Thus, the embodiments of the present invention provide improved throttle control methods, which are described in detail in the following paragraphs.

Figure 2:
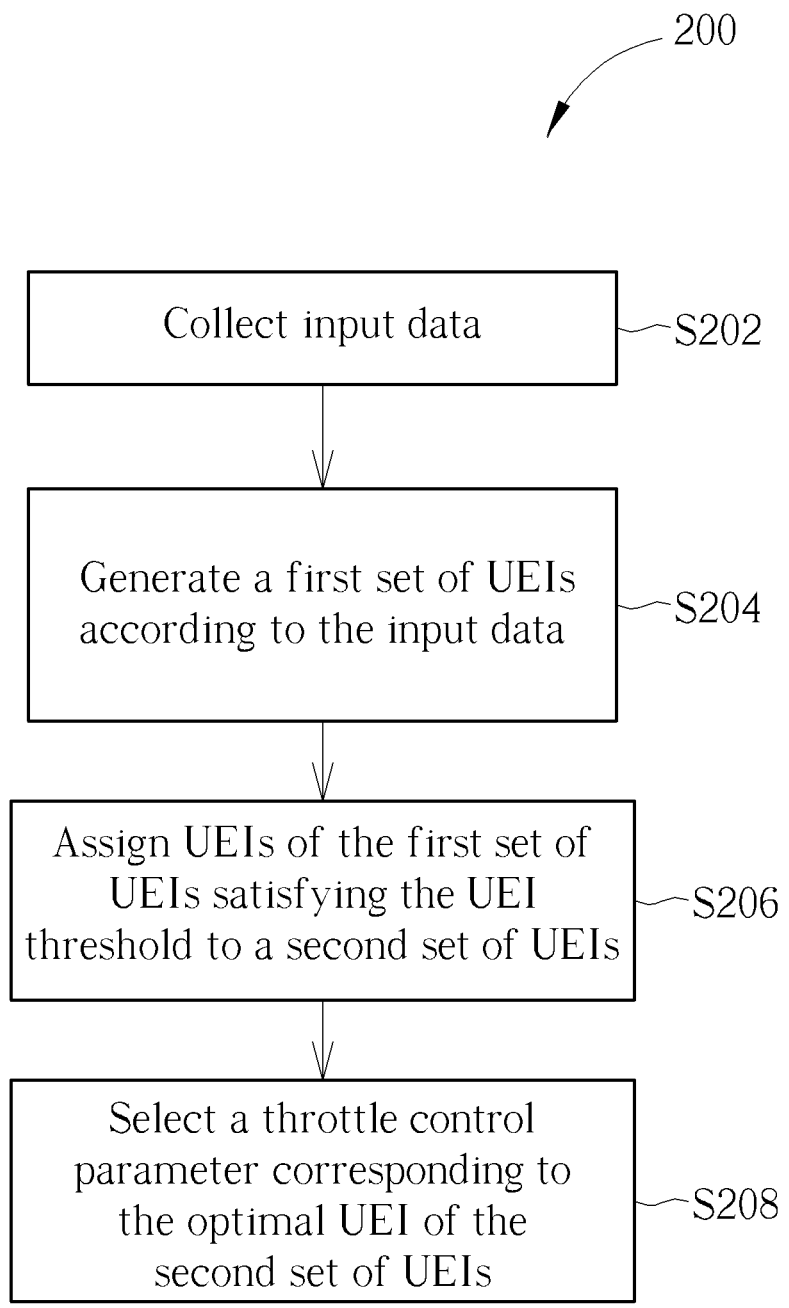
FIG. 2 is a flowchart of the throttle control method of an embodiment.

FIG. 2 is a flowchart of the throttle control method 200. The throttle control method 200, executed by the mobile device 100, includes the following steps:

S202: Collect input data;
S204: Generate a first set of user experience indices (UEIs) according to the input data;
S206: Assign user experience indices of the first set of user experience indices satisfying the UEI threshold to a second set of user experience indices; and
S208: Select a throttle control parameter corresponding to the optimal user experience index of the second set of user experience indices.

After the throttle control parameter is selected, the selected throttle control parameter can either be applied to configure the mobile device 100 or be sent to a wireless network for throttle control.

The user experience indices satisfying the UEI threshold may be the user experience indices higher than the UEI threshold. The optimal user experience index may be the highest user experience index. That is, the user experience indices can be designed accordingly. The present invention is not limited thereto.

The throttle control method 200 can be triggered periodically (e.g., 20 ms-500 ms) to avoid unnecessary power consumption by executing it too often. In step S202, the input data includes two types of data: current configuration data and common information data. The current configuration data are data that can be parameters in the throttle control parameters. These may include number of component carriers, bandwidth, number of MIMO layers, number of receives (RX), transmit (TX) power limitation, uplink throttle status and antenna in module (AiM) utilization . . . etc. The common information data are data do not belong to current configuration data, which may include base temperature, component temperatures, recent average downlink/uplink throughput, recent maximum downlink/uplink throughput, recent average TX power, recent maximum TX power, signaling interference status, signal quality, application information (e.g., apps running on the mobile device) and screen on/off status . . . etc.

In step S204, each user experience index of the first set of user experience indices corresponds to a throttle control parameter. The user experience indices can be generated by a machine learning model, an algorithm and/or an expert system.

For example, the user experience index can be determined by a machine learning model with the following equation:

$$UEI = DL\_Tput \times w1 + UL\_Tput \times w2 + VQ \times w3 + Latency \times w4$$

UEI represents the user experience index and it may have the range between 0 and 1; 0 represents user experience of heavy impact and 1 represented user experience of no impact. DL_Tput represents downlink throughput downgrade level. UL_Tput represents uplink throughput downgrade level. VQ represents voice quality downgrade level. Latency represents latency downgrade level. w1, w2, w3 and w4 represent weights. In the above equation, each parameter has its weight and the weights can be different in various scenarios. For example, the weight of the latency downgrade level may be higher in gaming scenario than that in IMS calls scenario. Thus, the characteristics of machine learning model make it an appropriate candidate for generating UEIs. However, other machine learning models, even handcrafted algorithms and expert systems may also be suitable for doing the above-mentioned computation. The machine learning model can also be trained with data labeling to enable simple prediction of the most suitable throttle control parameter. The present invention is not limited thereto.

Figure 3:
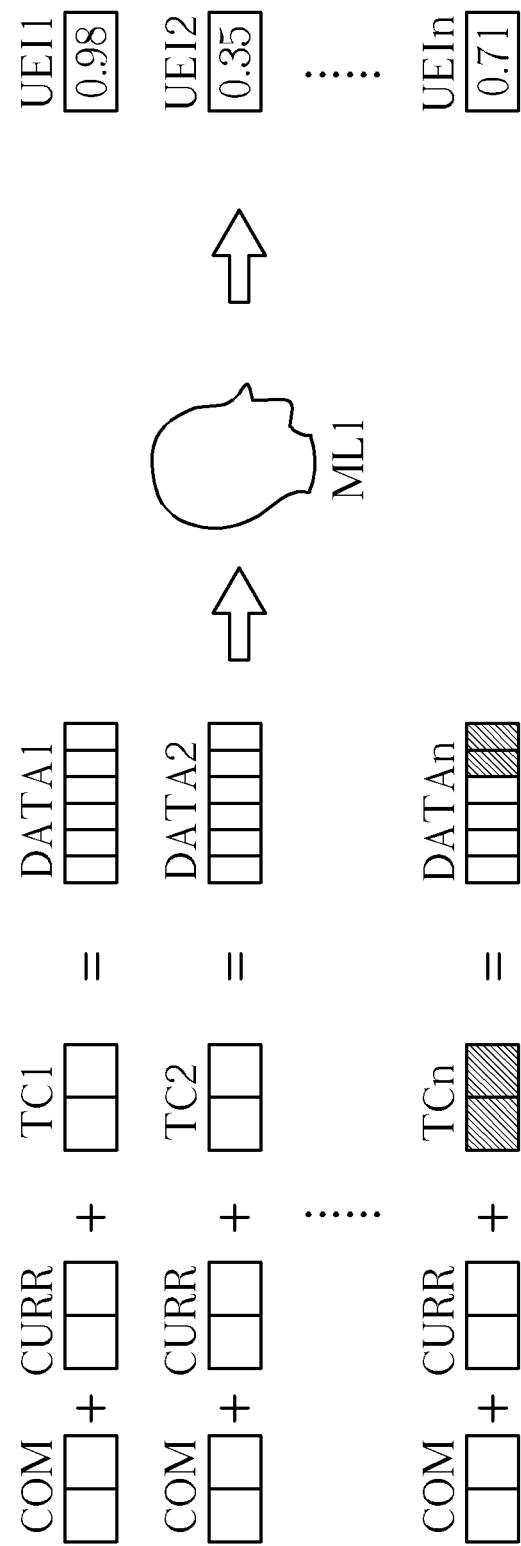
FIG. 3 is a diagram illustrating the process of user experience index generation.
Figure 4:
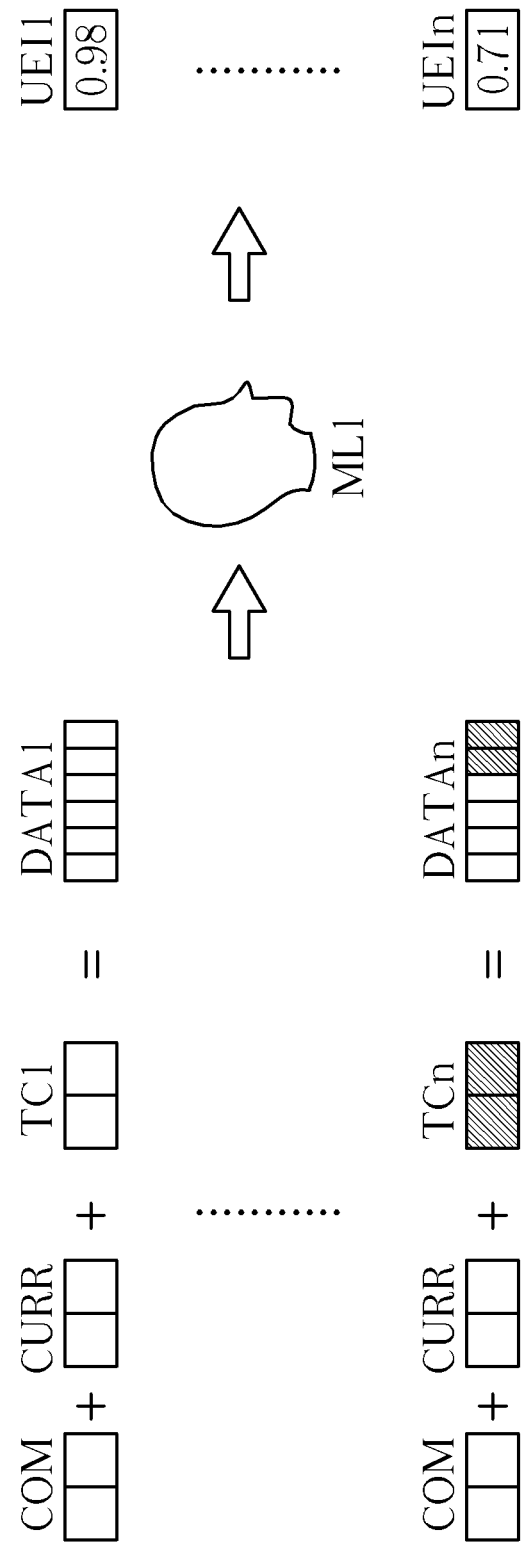
FIG. 4 is another diagram illustrating the process of user experience index generation.

FIGS. 3 and 4 are diagrams illustrating the process of user experience index generation. In actual application, the machine learning model takes in the various above-mentioned common information data and current configuration data with throttle control parameters to generate user experience indices. As shown in FIG. 3, the common configuration data COM (e.g., device temperature), the current configuration data CURR (e.g., number of MIMO layers) and throttle control parameter TC1 (e.g., reducing the maximum TX power for the LTE band and/or the FR1 band by 3 dB) form the first set of input data DATA1. The input data DATA1 can then be input to the machine learning model ML1 to generate the first user experience index UEI1 (e.g., 0.98). The same common configuration data COM and the current configuration data CURR with a different throttle control parameter TC2 form the second set of input data DATA2. The input data DATA2 can then be input to the machine learning model ML1 to generate the second user experience index UEI2 (e.g., 0.35). The process can be repeated for n times, wherein n is a positive integer. The same common configuration data COM and the current configuration data CURR with the throttle control parameter TCn form the nth set of input data DATAn. The input data DATAn can then be input to the machine learning model ML1 to generate the nth user experience index UEIn (e.g., 0.71) and so on. These form the first set of user experience indices.

In step S206, if a user experience index (e.g., UEI2=0.35) is lower than a threshold, for example, 0.5, the user experience index (e.g., UEI2) with the corresponding input data would be dropped. As shown in FIG. 4, the remaining user experience indices (i.e., the user experience indices higher than the threshold) with the corresponding input data form a second set of user experience indices.

In step S208, the mobile device 100 (e.g., the processor 20) can compare each one of the second set of the user experience indices to obtain the highest user experience index (i.e., user experience index UEI1) with the corresponding throttle control parameter TC1. Then, the throttle control parameter TC1 would be selected and applied to configure the mobile device 100 or be sent to a wireless network for throttle control. Comparing to the conventional method, the throttle control method 200 has the advantage of considering user scenarios, better trigger timing, more throttle control options, and referring to more parameters. As such, the throttle control can be optimized with higher precision, thus improving user experience.

Those skilled in the art can easily modify the above-mentioned throttle control method 200 to a different threshold or to a different condition of optimal user experience index. Thus, the invention is not limited thereto.

Figure 5:
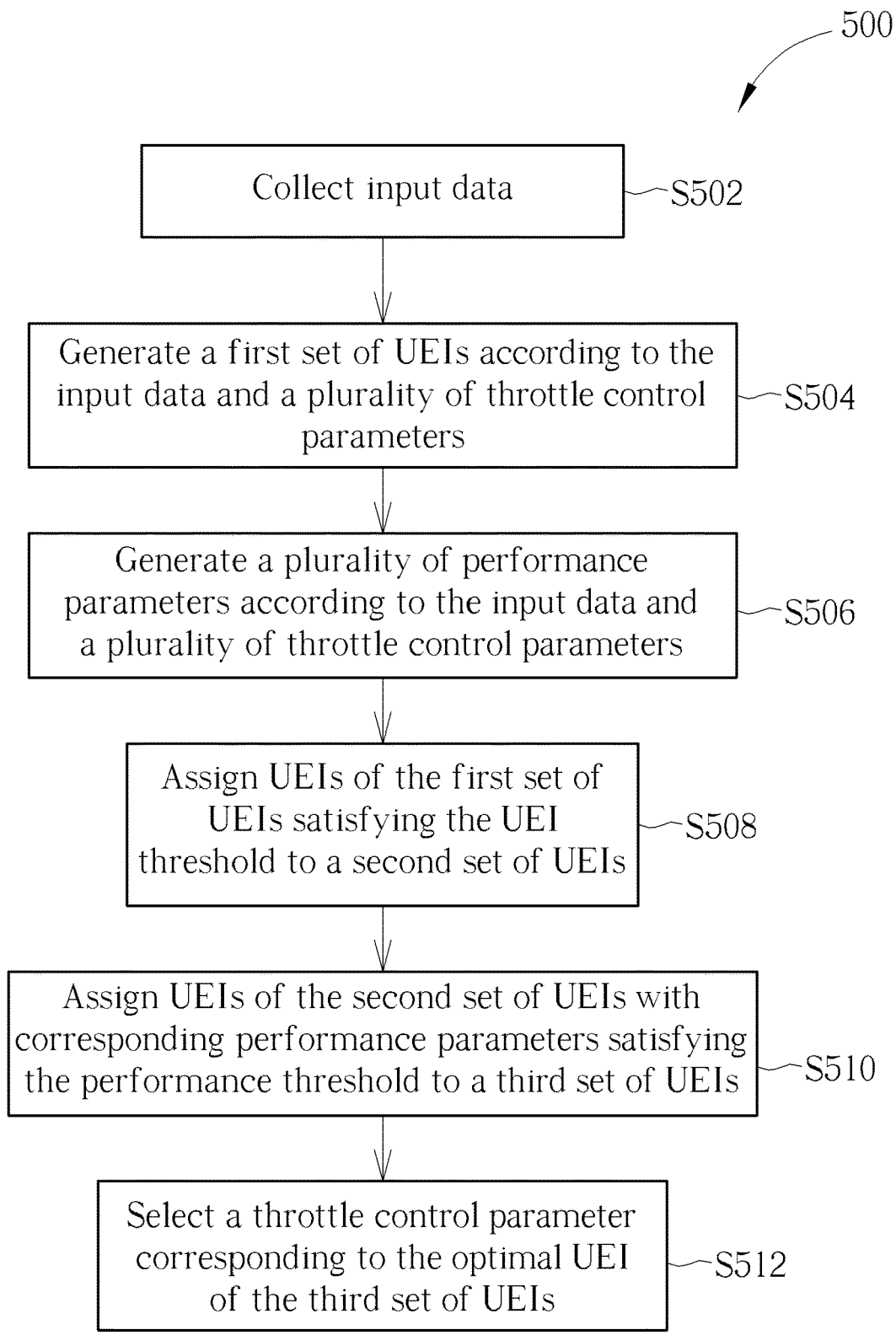
FIG. 5 is a flowchart of the throttle control method of another embodiment.

FIG. 5 is a flowchart of the throttle control method 500. The throttle control method 500, executed by the mobile device 100, includes the following steps:

S502: Collect input data;
S504: Generate a first set of user experience indices (UEIs) according to the input data and a plurality of throttle control parameters;
S506: Generate a plurality of performance parameters according to the input data and a plurality of throttle control parameters;
S508: Assign user experience indices of the first set of user experience indices satisfying the UEI threshold to a second set of user experience indices;
S510: Assign user experience indices of the second set of user experience indices with corresponding performance parameters satisfying the performance threshold to a third set of user experience indices; and
S512: Select a throttle control parameter corresponding to the optimal user experience index of the third set of user experience indices.

After the throttle control parameter is selected, the selected throttle control parameter can either be applied to configure the mobile device 100 or be sent to a wireless network for throttle control.

The user experience indices satisfying the UEI threshold may be the user experience indices higher than the UEI threshold. The optimal user experience index may be the highest user experience index. That is, the user experience indices can be designed accordingly. The present invention is not limited thereto.

Figure 6:
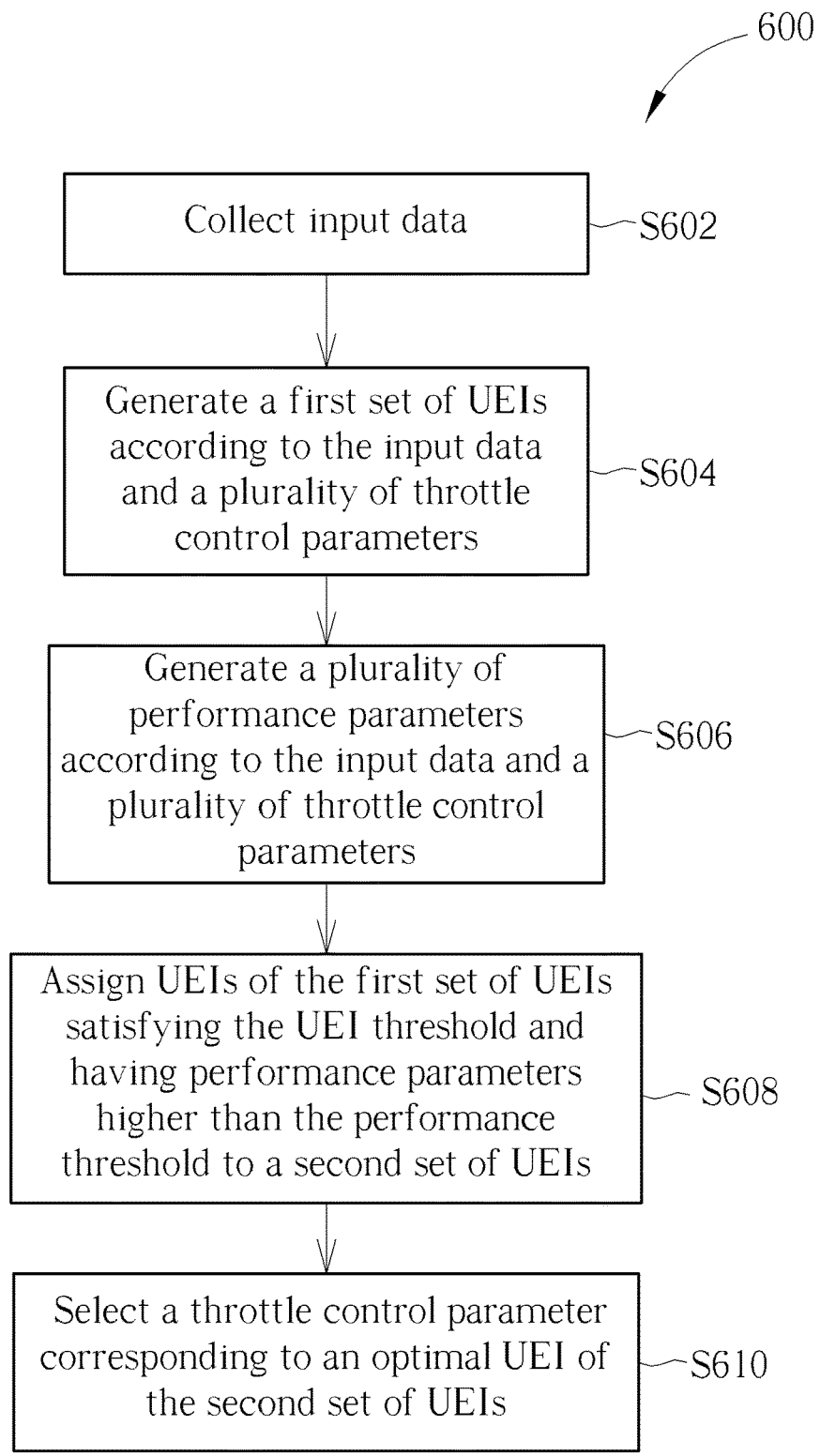
FIG. 6 is a flowchart of the throttle control method of another embodiment.

The throttle control method 500 can be further simplified to the throttle control method 600 illustrated in FIG. 6. FIG. 6 is a flowchart of the throttle control method 600. The throttle control method 600, executed by the mobile device 100, includes the following steps:

S602: Collect input data;
S604: Generate a first set of user experience indices (UEIs) according to the input data and a plurality of throttle control parameters;
S606: Generate a plurality of performance parameters according to the input data and a plurality of throttle control parameters;
S608: Assign user experience indices of the first set of user experience indices satisfying the UEI threshold and having performance parameters higher than the performance threshold to a second set of user experience indices; and
S610: Select a throttle control parameter corresponding to an optimal user experience index of the second set of user experience indices.

After the throttle control parameter is selected, the selected throttle control parameter can either be applied to configure the mobile device 100 or be sent to a wireless network for throttle control.

The user experience indices satisfying the UEI threshold may be the user experience indices higher than the UEI threshold. The optimal user experience index may be the highest user experience index. That is, the user experience indices can be designed accordingly. The present invention is not limited thereto.

In this case, the processor 20 can determine simultaneously which user experience indices being higher than the UEI threshold and which performance parameters being higher than the performance threshold.

Similar to method 200, the input data of the throttle control methods 500 and 600 include two types of data: current configuration data and common information data. Each user experience index of the first set of user experience indices corresponds to a throttle control parameter and each performance parameter corresponds to a throttle control parameter and a user experience index. The user experience indices can be generated by a machine learning model, an algorithm and/or an expert system. The performance parameters can be generated by the same machine learning model, algorithm or expert system, or by a different machine learning model, algorithm or expert system. The invention is not limited thereto.

Figure 7:
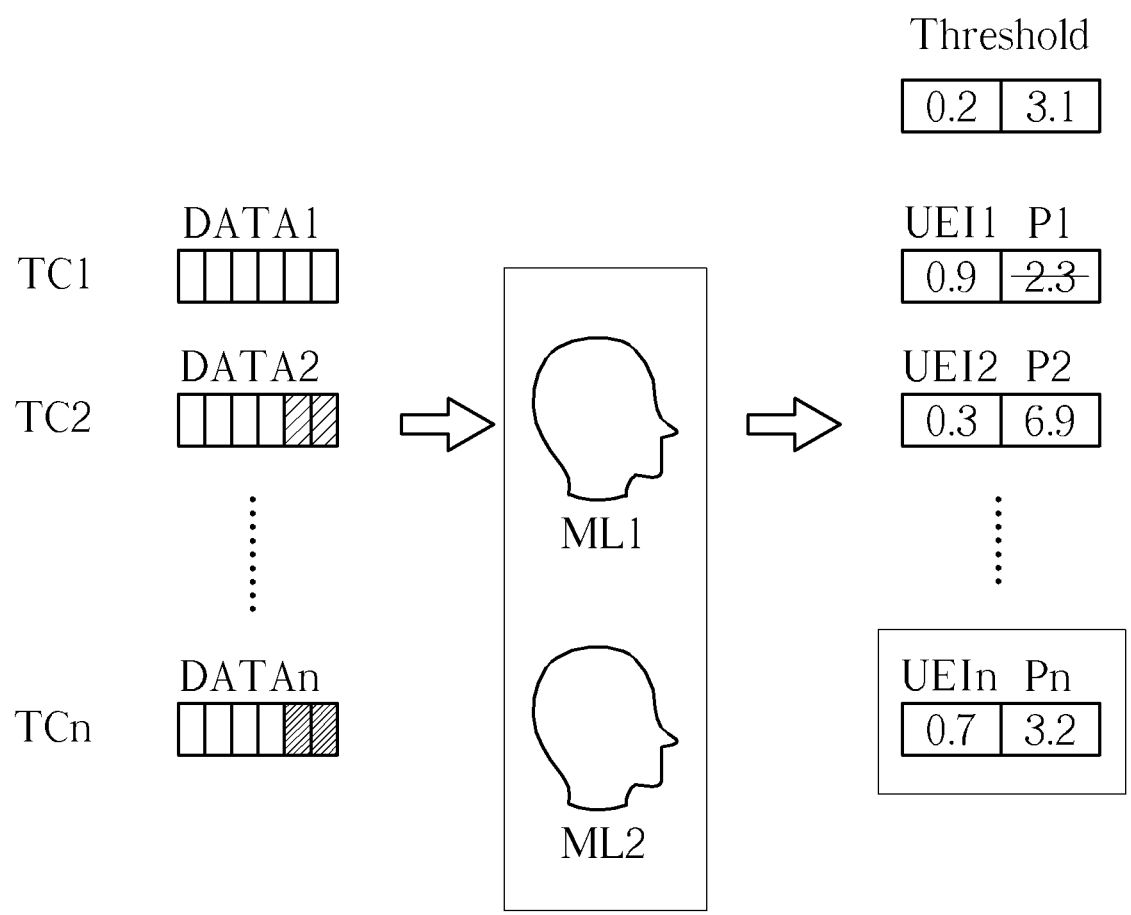
FIG. 7 is a diagram illustrating the process of performance parameter generation.

In some embodiments, the performance parameters may include power downgrade and/or temperature downgrade. FIG. 7 is a diagram illustrating the process of performance parameter generation, taking method 500 as the example. In step S506, in addition to generating user experience indices, the machine learning model can also generate corresponding performance parameters (e.g., power downgrade) as illustrated in FIG. 7. The input data DATA1-DATAn can be formed by the same process described in FIG. 3 and related paragraphs. The input data DATA1 can be input to the machine learning models ML1 and ML2 to respectively generate the first user experience index UEI1 (e.g., 0.9) and its corresponding power downgrade P1 (e.g. 2.3 W). The input data DATA2 can be input to the machine learning models ML1 and ML2 to respectively generate the second user experience index UEI2 (e.g., 0.3) and its corresponding power downgrade P2 (e.g. 6.9 W). The process can be repeated for n times, wherein n is a positive integer. The input data DATAn can be input to the machine learning models ML1 and ML2 to respectively generate the nth user experience index UEIn (e.g., 0.7) and its corresponding power downgrade Pn (e.g. 3.2 W), and so on.

In step S508, the user experience indices are compared to the UEI threshold. In step S510, the performance parameters are compared to the performance threshold. As shown in FIG. 7, the UEI threshold can be 0.2 and the power downgrade threshold (i.e., performance threshold) can be 3.1 W. Those input data DATA1-DATAn with user experience indices UEI1-UEIn lower than 0.2 would be dropped. The comparison is executed again for the remaining user experience indices with corresponding power downgrade. The remaining user experience indices with corresponding power downgrade lower than 3.1 would be dropped. In this case, the user experience index UEI1 with power downgrade P1 (e.g., 2.3) is dropped.

In step S512, the throttle control parameter TCn corresponding to the highest user experience index (e.g., UEIn=0.7) of the remaining user experience indices is selected. Then, the throttle control parameter TCn would be selected and applied to configure the mobile device 100 or be sent to a wireless network for throttle control.

The method 600 is an alternative embodiment similar to the method 500. The description is not repeated here for the sake of brevity.

Comparing to the conventional method, the throttle control methods 500 and 600 has the advantage of considering user scenarios, better trigger timing, more throttle control options, and referring to more parameters. As such, the throttle control can be optimized with higher precision, thus improving user experience.

Those skilled in the art can easily modify the above-mentioned throttle control methods 500 and 600 to a different threshold or to a different condition of optimal user experience index. Thus, the invention is not limited thereto.

Figure 8:
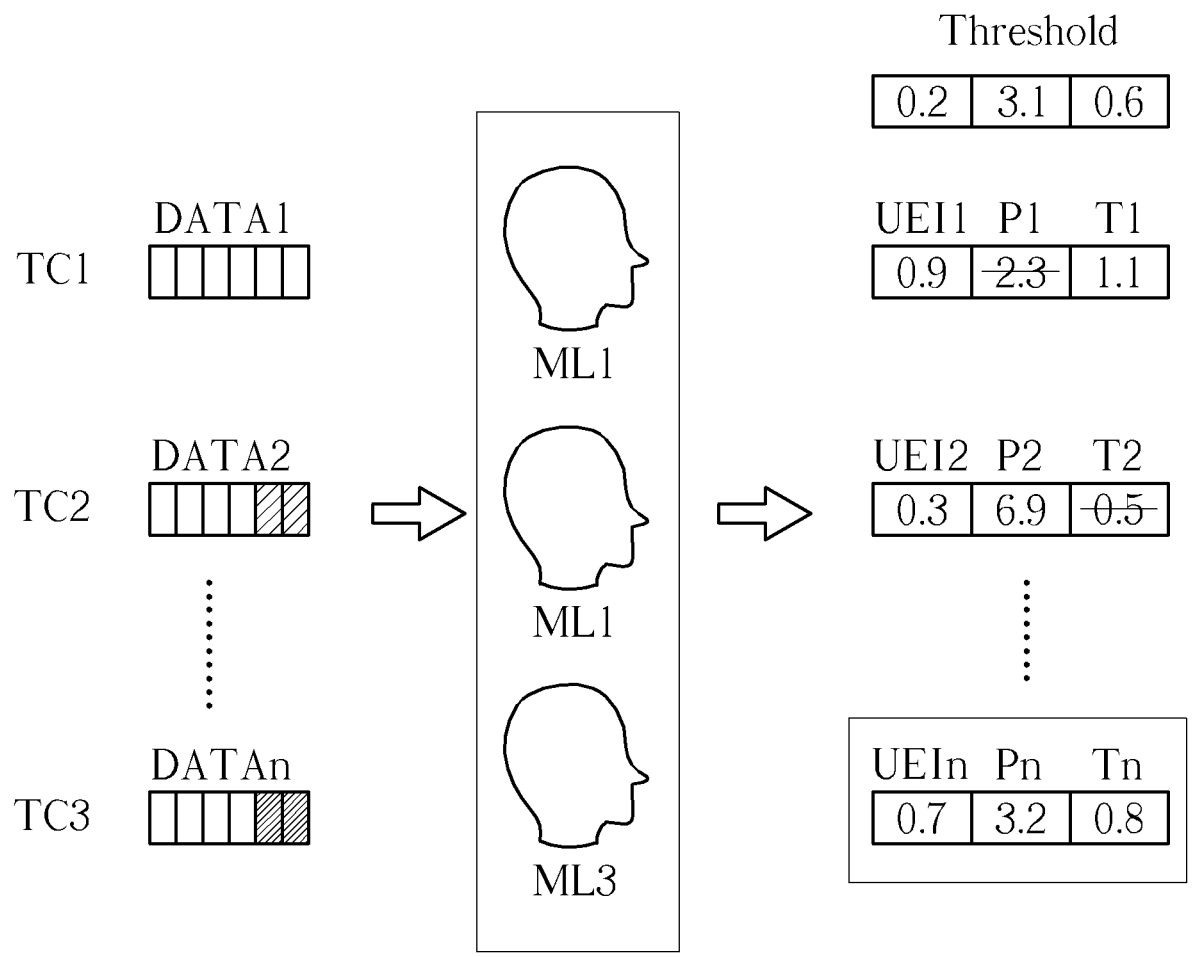
FIG. 8 is another diagram illustrating the process of performance parameter generation.

The above-mentioned throttle control methods can be further expanded to incorporate another performance parameter. FIG. 8 is another diagram illustrating the process of performance parameter generation. Another performance parameter (i.e., temperature downgrade) is added to the throttle control method. The input data DATA1-DATAn can be formed by the same method described in FIG. 3 and related paragraphs. The input data DATA1 can be input to the machine learning models ML1, ML2 and ML3 to respectively generate the first user experience index UEI1 (e.g., 0.9) and its corresponding power downgrade P1 (e.g. 2.3 Watts (W)) and temperature downgrade T1 (e.g., 1.1° C.). The input data DATA2 can be input to the machine learning models ML1, ML2 and ML3 to respectively generate the second user experience index UEI2 (e.g., 0.3) and its corresponding power downgrade P2 (e.g. 6.9 W) and temperature downgrade T2 (e.g., 0.5° C.). The process can be repeated for n times, wherein n is a positive integer. The input data DATAn can be input to the machine learning models ML1, ML2 and ML3 to respectively generate the nth user experience index UEIn (e.g., 0.7) and its corresponding power downgrade Pn (e.g. 3.2 W) and temperature downgrade Tn (e.g., 0.8° C.), and so on.

As shown in FIG. 8, the UEI threshold can be 0.2; the power downgrade threshold can be 3.1 W; the temperature downgrade threshold can be 0.6° C. Those input data DATA1-DATAn with user experience indices UEI1-UEIn lower than 0.2 would be dropped. The comparison is executed again for power downgrade. The remaining user experience indices with corresponding power downgrade lower than 3.1 W would be dropped. In this case, the user experience index UEI1 with power downgrade P1 (e.g., 2.3 W) is dropped. Then, the comparison is executed again for temperature downgrade. The remaining user experience indices with corresponding temperature downgrade lower than 0.6 would be dropped. In this case, the user experience index UEI2 with temperature downgrade T2 (e.g., 0.5° C.) would be dropped. The throttle control parameter TCn corresponding to the highest user experience index (e.g., UEIn=0.7) of the remaining user experience indices is selected. Then, the throttle control parameter TCn would be selected and applied to configure the mobile device 100 or be sent to a wireless network for throttle control.

However, the invention is not limited thereto. As illustrated above, the throttle control method of the embodiments is capable of incorporating more performance parameters to optimize throttle control of the mobile device 100 with higher precision.

The various embodiments of the throttle control system and method described in this disclosure has the advantage of considering user scenarios, better trigger timing, more throttle control options, and referring to more parameters. As such, throttle control for mobile devices can be optimized with higher precision, thus improving user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A throttle control method for a mobile device comprising:
   collecting input data;
   generating a first set of user experience indices (UEI) according to the input data; and
   checking whether a user experience index of the first set of user experience indices satisfies a UEI threshold;
   wherein:
   the input data comprises common information data, current configuration data and a plurality of throttle control parameters; and
   each user experience index of the first set of user experience indices is corresponding to at least one of throttle control parameter of the plurality of throttle control parameters.

2. The throttle control method of claim 1 further comprising:
   assigning user experience indices of the first set of user experience indices satisfying the UEI threshold to a second set of user experience indices; and
   selecting at least one throttle control parameter of the plurality of throttle control parameters corresponding to a user experience index of the second set of user experience indices.

3. The throttle control method of claim 2 further comprising applying the selected throttle control parameter to configure the mobile device.

4. The throttle control method of claim 2 further comprising sending the selected throttle control parameter to a wireless network.

5. The throttle control method of claim 2, wherein selecting at the least one throttle control parameter corresponding to a user experience index of the second set of user experience indices is selecting the least one throttle control parameter corresponding to an optimal user experience index of the second set of user experience indices.

6. The throttle control method of claim 2, wherein the user experience indices of the first set of user experience satisfying the UEI threshold are the user experience indices higher than the UEI threshold.

7. The throttle control method of claim 1 further comprising:
generating a plurality of performance parameters according to the input data;
assigning user experience indices of the first set of user experience indices satisfying the UEI threshold to a second set of user experience indices;
assigning user experience indices of the second set of user experience indices with corresponding performance parameters satisfying a performance threshold to a third set of user experience indices; and
selecting at least one throttle control parameter corresponding to a user experience index of the third set of user experience indices.

8. The throttle control method of claim 7 wherein the performance parameters comprise at least one of power downgrade and temperature downgrade.

9. The throttle control method of claim 7, wherein selecting at the least one throttle control parameter corresponding to a user experience index of the third set of user experience indices is selecting the least one throttle control parameter corresponding to an optimal user experience index of the third set of user experience indices.

10. The throttle control method of claim 1 further comprising:
generating a plurality of performance parameters according to the input data;
assigning user experience indices of the first set of user experience indices satisfying the UEI threshold and having performance parameters satisfying a performance threshold to a second set of user experience indices;
selecting at least one throttle control parameter corresponding to a user experience index of the second set of user experience indices.

11. The throttle control method of claim 10, wherein selecting at the least one throttle control parameter corresponding to a user experience index of the second set of user experience indices is selecting the least one throttle control parameter corresponding to an optimal user experience index of the second set of user experience indices.

12. The throttle control method of claim 1, wherein generating the first set of user experience indices according the input data is generating the first set of user experience indices according to the input data through at least one of a machine learning model, a handcrafted algorithm, and an expert system.

13. The throttle control method of claim 12, wherein the machine learning model comprises an equation:

$$UEI = DL\_Tput \times w1 + UL\_Tput \times w2 + VQ \times w3 + Latency \times w4$$

wherein:
UEI is the user experience index;
DL_Tput is downlink throughput downgrade level;
UL_Tput is uplink throughput downgrade level;
VQ is voice quality downgrade level;
Latency is latency downgrade level; and
w1, w2, w3 and w4 are weights.

14. The throttle control method of claim 1, wherein the throttle control parameters comprise at least one of transmit (TX) power control, uplink throttle, antenna in module head switch, MIMO reduction, receives (RX) numbers reduction, bandwidth reduction and component carrier (CC) reduction.

15. The throttle control method of claim 1, wherein the current configuration data comprises at least one of number of component carriers, a bandwidth, number of MIMO layers, number of receives (Rx), a transmit (Tx) power limitation, an uplink throttle status and antenna in module (AiM) utilization.

16. A mobile device comprising:
an antenna;
a memory; and
a processor coupled to the memory and the antenna, configured to:
collect input data, the input data comprising common information data, current configuration data and a plurality of throttle control parameters;
generate a first set of user experience indices according to the input data;
check whether a user experience index of the first set of user experience satisfies a UEI threshold;
assign user experience indices of the first set of user experience indices satisfying the UEI threshold to a second set of user experience indices;
select at least one throttle control parameter of the plurality of throttle control parameters corresponding to a user experience index of the second set of user experience indices; and
apply the selected throttle control parameter to configure the mobile device;
wherein each user experience index of the first set of user experience indices is corresponding to at least one of throttle control parameter of the plurality of throttle control parameters.

17. The mobile device of claim 16, wherein the processor is further configured to select at least one throttle control parameter corresponding to an optimal user experience index of the second set of user experience indices.

18. The mobile device of claim 16, wherein the current configuration data comprises at least one of number of component carriers, a bandwidth, number of MIMO layers, number of receives (Rx), a transmit (Tx) power limitation, an uplink throttle status and antenna in module (AiM) utilization.

19. The mobile device of claim 16, wherein the throttle control parameters comprise at least one of transmit (TX) power control, uplink throttle, antenna in module head switch, MIMO reduction, receives (RX) numbers reduction, bandwidth reduction and component carrier (CC) reduction.

* * * * *